US008116422B2

(12) United States Patent
Lutz et al.

(10) Patent No.: US 8,116,422 B2
(45) Date of Patent: Feb. 14, 2012

(54) LWR FLOW CHANNEL WITH REDUCED SUSCEPTIBILITY TO DEFORMATION AND CONTROL BLADE INTERFERENCE UNDER EXPOSURE TO NEUTRON RADIATION AND CORROSION FIELDS

(75) Inventors: Daniel Reese Lutz, San Jose, CA (US); Gerald Allen Potts, Wilmington, NC (US); Yang-Pi Lin, Wilmington, NC (US); Sheikh Tahir Mahmood, Pleasanton, CA (US); Mark Andrew Dubecky, Wilmington, NC (US); David William White, Wilmington, NC (US); John Schardt, Wilmington, NC (US)

(73) Assignee: General Electric Company, Shenectady, NY (US)

( * ) Notice: Subject to any disclaimer, the term of this patent is extended or adjusted under 35 U.S.C. 154(b) by 1263 days.

(21) Appl. No.: 11/320,477

(22) Filed: Dec. 29, 2005

(65) Prior Publication Data
US 2007/0153963 A1 Jul. 5, 2007

(51) Int. Cl.
*G21C 9/00* (2006.01)
*G21C 7/10* (2006.01)
(52) U.S. Cl. .................. 376/277; 376/305; 376/412
(58) Field of Classification Search .................. 376/277
See application file for complete search history.

(56) References Cited

U.S. PATENT DOCUMENTS

| 5,080,861 | A | * | 1/1992 | Garde | 420/422 |
| 5,560,790 | A | | 10/1996 | Nikulina et al. | |
| 5,805,656 | A | | 9/1998 | Adamson | |
| 5,844,959 | A | * | 12/1998 | Van Swam et al. | 376/412 |
| 2005/0194073 | A1 | * | 9/2005 | Hamano et al. | 148/608 |

FOREIGN PATENT DOCUMENTS

| EP | 0 559 096 | | 9/1993 |
| WO | WO-2004/72318 A1 | * | 8/2004 |
| WO | WO 2006/004499 | | 1/2006 |

OTHER PUBLICATIONS

European Search Report dated Nov. 29, 2011.

* cited by examiner

*Primary Examiner* — Johannes P Mondt
(74) *Attorney, Agent, or Firm* — Harness, Dickey & Pierce, P.L.C.

(57) ABSTRACT

A zirconium alloy suitable for forming reactor components that exhibit reduced irradiation growth and improved corrosion resistance during operation of a light water reactor (LWR), for example, a boiling water reactor (BWR). During operation of the reactor, the reactor components will be exposed to a strong, and frequently asymmetrical, radiation fields sufficient to induce or accelerate corrosion of the irradiated alloy surfaces within the reactor core. Reactor components fabricated from the disclosed zirconium alloy will also tend to exhibit an improved tolerance for cold-working during fabrication of the component, thereby simplifying the fabrication of such components by reducing or eliminating subsequent thermal processing, for example, anneals, without unduly degrading the performance of the finished component.

6 Claims, 4 Drawing Sheets

Performance Comparison Between Recrystallized Zr-2 and NSF

Performance Comparison Between E635 and NSF

Relative Comparison of Channel Susceptibility to Late Life Fabrication Related Cold Work-Induced Channel Distortion

LWR FLOW CHANNEL WITH REDUCED SUSCEPTIBILITY TO DEFORMATION AND CONTROL BLADE INTERFERENCE UNDER EXPOSURE TO NEUTRON RADIATION AND CORROSION FIELDS

BACKGROUND OF THE INVENTION

The present invention relates to materials and methods for eliminating or reducing the likelihood of interference between reactor components, for example, a flow channel and an associated control blade, in a nuclear reactor core so that the shutdown and operation of the plant can be performed more efficiently and safely. Channels used in the nuclear energy industry are typically formed from the zirconium alloys, such as Zircaloy-2 and Zircaloy-4, which have relatively high general corrosion resistance, but which are also known to be susceptible to bowing. It has been shown that interference between a flow channel and an associated control blade can result from deformation, specifically bowing, of the flow channel as a result of non-uniformity, particularly side-to-side differences, in the irradiation-induced growth or the hydrogen content of the flow channel material.

These differences in the hydrogen content have recently been discovered to be attributable at least in part to corrosion differences that are related to localized "shadow" corrosion resulting from enhanced corrosion induced by the close proximity of the dissimilar materials of the control blade and certain regions on two of four adjacent channel sides. The corrosion of zirconium alloys in aqueous environments generates hydrogen as a reaction product. A portion, commonly referred to as the pickup fraction, is absorbed into the alloy and can induce a dimensional change, specifically dilation, of the zirconium alloy component. Bowing from all sources is additive, and therefore the adverse effect of shadow corrosion bowing is exacerbated when irradiation growth, a phenomenon resulting from exposure to differential radiation gradients is also occurring in the control blade and flow channel components.

The service life of a boiling water reactor (BWR) fuel channel is generally limited by the ability of the channel to resist longitudinal bowing, creep and corrosion. Bowing has been attributed to the alloys' irradiation growth properties wherein neutron irradiation tends to increase the length of a zirconium-based alloy in a direction coincident with the rolling direction of the irradiated component. This phenomenon is known to be a strong function of fast neutron fluence and the persistent presence of a gradient which can be present transversely through a channel resulting from a higher fast neutron flux level at the center of the core than towards the perimeter of the core.

Accordingly, in the presence of a persistent flux gradient, there is a tendency for one side of a fuel channel to "grow" more than the opposite side of the channel and causing the channel to develop a longitudinal bow. While the longitudinal bow may not be enough to alter the flow or mechanical properties of the channel significantly, the bowing can be sufficient to increase the likelihood of interference with the free movement of its adjacent control blade, which must be capable of being moved along or stroked relative to the channel for controlling the nuclear reaction. Eventually, some channels may develop an unacceptable degree of bowing and will need to be replaced.

The degree to which a Zircaloy component will exhibit irradiation growth is a function of the alloy composition and its metallurgical state, specifically the crystallographic texture of the component and the extent of any retained cold work or residual stress, which can enhance irradiation growth. One method for reducing the tendency for zirconium alloy fuel channels to bow is a metallurgical treatment applied to the zirconium alloy to reduce its propensity for irradiation growth. One such method includes the combined steps of heat treating, warm forming and thermal sizing a Zircaloy alloy to yield a fuel channel that exhibits a random texture, reduced residual stress and hence reduced irradiation growth. Another method for reducing channel bow is to form the fuel channels from a zirconium alloy that exhibits inherently reduced irradiation growth.

One class of zirconium alloys that is promising for low irradiation growth applications are those containing niobium. One such alloy has an approximate composition of, in weight percent, about 1.2% tin (Sn), about 1.0% niobium (Nb), and an iron (Fe) content of about 0.34-0.40%, with the balance comprising essentially zirconium (Zr) and incidental impurities. One such alloy, which has an exemplary composition of $Zr_{0.974}Sn_{0.012}Nb_{0.01}Fe_{0.004}$, is identified within the art as Alloy E635. General Electric has developed and continues to refine a class of Zr—Nb alloys, referred to as NSF, that have a composition of, in weight percent, about 0.5-1.2% tin, about 0.6-1.2% niobium and about 0.2-0.5% iron with the balance essentially zirconium and incidental impurities.

The term NSF is a somewhat generic term reflecting the presence of niobium (Nb), tin (Sn) and iron (Fe) as the primary alloying metals combined with the zirconium. Another variation has been employed by the Westinghouse Electric Corporation under the name ZIRLO that utilizes a composition of, in weight percent, about 1.0% tin, about 1.0% niobium, and about 0.1% iron, with the balance essentially zirconium and incidental impurities, and was developed primarily for use as fuel cladding in pressurized water reactors (PWR) for improving upon the corrosion resistance provided by Zircaloy-4 in PWR environments.

However, it is well known that the corrosion resistance of a particular zirconium alloy is highly dependent on the type of reactor environment in which it is used, and that the relative corrosion resistance, hydrogen pickup, and shadow corrosion bowing resistance of a particular alloy composition within a given environment cannot be accurately predicted based on its composition. In the case of the Zr—Nb alloys, testing has indicated that these alloys generally have a lower resistance to corrosion than the Zircaloy alloys when employed in boiling water reactor (BWR) environments.

While the zirconium alloys and their processes have provided advances in resistance to corrosion and longitudinal bowing, further improvements are desired to yield nuclear reactor components, such as fuel channels, that are capable of a longer service life, particularly in boiling water reactor environments, and particularly when exacerbated by the newly discovered phenomenon of shadow corrosion-induced bowing.

SUMMARY OF THE INVENTION

The exemplary flow channel construction materials according to the invention exhibit a reduced likelihood of deformation, even when subjected to non-uniform exposures including, differential irradiation, differential corrosion-induced hydrogen pickup, and possibly creep, while providing reduced sensitivity to cold work induced irradiation growth acceleration. An exemplary embodiment of the invention is a Zr—Nb—Sn—Fe alloy having a low Ni content that, when compared to conventional Zircaloy compositions, exhibits one or more improved properties selected from a group including reduced hydrogen pickup, reduced sensitivity to cold work enhanced irradiation growth acceleration, reduced irradiation growth properties and/or improved creep resistance.

BRIEF DESCRIPTION OF THE DRAWINGS

The scope of the invention will become more apparent to those of ordinary skill in the art by referring to the detailed description of example embodiments provided below with reference to the attached drawing in which.

DETAILED DESCRIPTION OF EXAMPLE EMBODIMENTS

As noted above, the tendency of flow channels within a reactor to bow or otherwise deform increases the likelihood of mechanical interference between the stainless steel control blade and Zr-alloy flow channel in, for example, BWRs. This likelihood of mechanical interference reduces plant safety margin and can lower plant efficiency. The primary factors that lead to the deformation of the flow channels are irradiation growth, creep bulging and differential hydrogen content caused by differential "shadow" corrosion rates occurring where the control blade is inserted and is in close proximity to the square channel on 2 of 4 adjacent sides.

Figure 1:
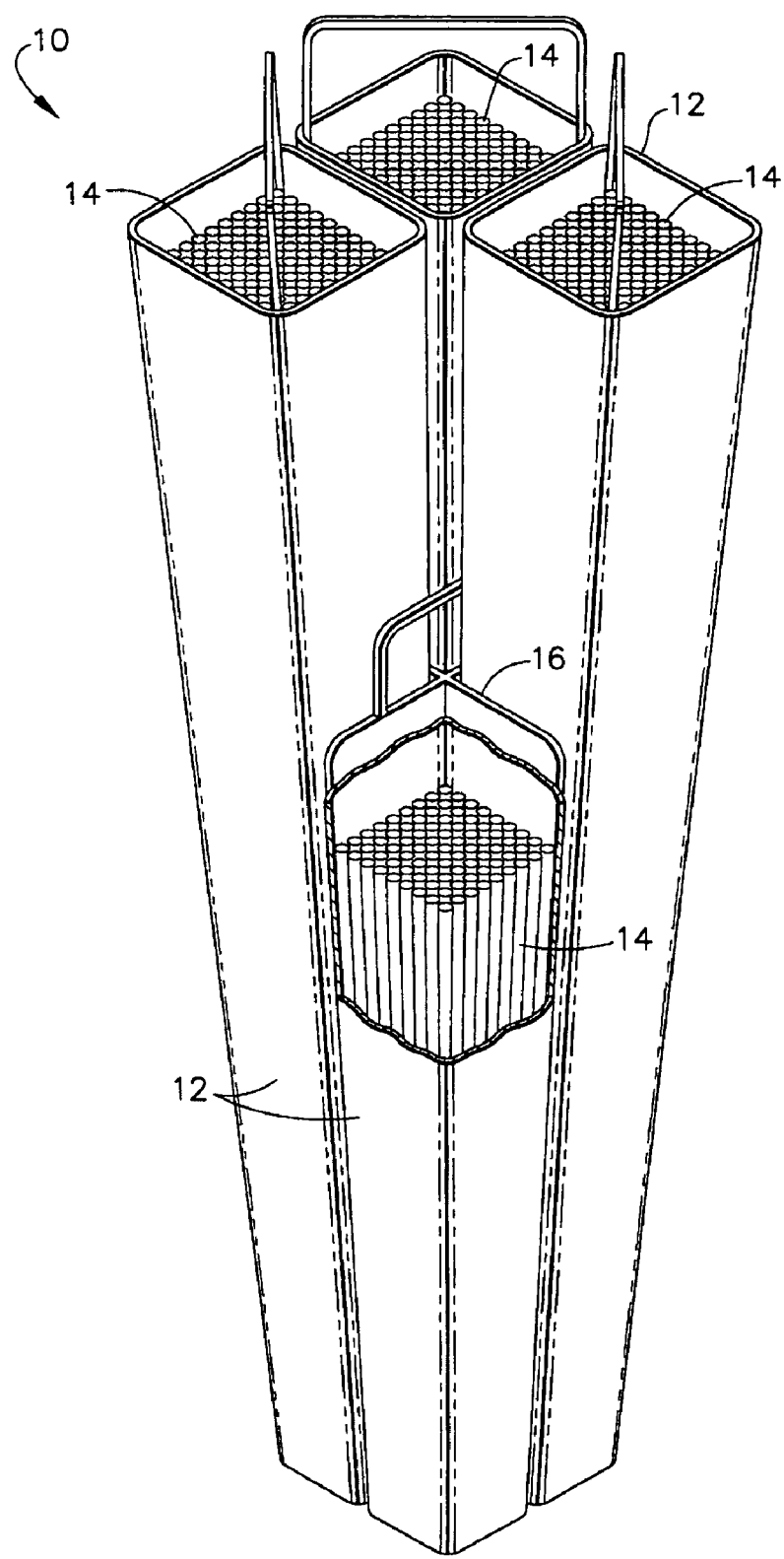
FIG. 1 provides a perspective view including a partial cross-sectional view of a conventional fuel assembly suitable for use in a boiling water reactor core.

As illustrated in the FIG. 1, a fuel assembly 10 for a boiling water reactor (BWR) may be configured to include a plurality of fuel channels 12 that each, in turn, will contain an array and/or bundles of fuel rods 14. The fuel assembly 10 also typically includes X-shaped or cross-shaped control rods 16 that may be moved up or down to control the interaction between adjacent arrays of fuel rods 14. The fuel channels 12 are necessarily formed from an alloy having a low absorption cross section to thermal neutrons to reduce the parasitic absorption of neutrons within the reactor core. Zirconium-based alloys, particularly as noted above Zircaloy-2 and Zircaloy-4, are widely used as the material from which the fuel channels and other components utilized within the reactor core are fabricated. These zirconium alloys exhibit reduced neutron absorption, sufficient mechanical strength across a range of typical reactor operation temperatures and/or a reduced tendency to interact with the water present in and circulating through the reactor environment.

The fuel channels 12 illustrated in the Figure are typically fabricated as hollow elongated components having a generally polygonal cross-section. For example the fuel channels may be fabricated to provide square-shaped cross-sections or a regular hexagon-shaped cross-sections. The fuel channels 12 are typically formed by rolling strips of a zirconium-based alloy, such as one of the Zircaloy alloys, bending the rolled strips into U-shaped or other complementary channel sections, and then welding two or more of the channel sections together to form a single fuel channel.

The fuel channels 12 also serve to direct and confine the coolant water flowing through the core and thereby provide a more predictable flow path around and among the fuel rods 14 arrayed within the channels. In a BWR, a portion of the coolant water flowing around and among the fuel rods will be vaporized by the heat released during fission of the fuel material contained within the fuel rods. Accordingly, during operation of a BWR, the fuel channels 12 provided in the reactor of a BWR will be exposed, for relatively long periods, to a hostile corrosive and radiation environment.

Fabricating the flow channels from one or more materials that exhibit reduced percentage hydrogen pickup relative to Zircaloy-2 and may also exhibit one or more other improvements including, for example, reduced irradiation growth and higher creep resistance than a conventional Zircaloy-2. This reduced hydrogen pickup by the reactor component will tend to lower the likelihood that the fuel channels or other reactor components fabricated from alloys according to the invention will exhibit unacceptable levels of deformation during the reactor fuel cycle. By reducing and/or delaying the deformation, for example, bowing, the need for intermediate maintenance or other adjustment in order to work properly between refueling operations can be reduced.

In addition to reducing the sensitivity of the reactor components to hydrogen pickup induced deformations, reactor components, for example, fuel channels, components fabricated from the claimed zirconium alloys tend to exhibit an improved tolerance to cold working. In conventional methods for fabricating reactor components, the stresses associated with cold working the components are typically removed to some extent though subsequent thermal treatment. In particular, the forming processes utilized for forming the initial strips, and the shaped pieces formed from those initial strips, tend to leave residual cold work in the finished channel assemblies.

Such subsequent treatments are utilized during the fabrication of reactor components from Zircaloy alloys in light of the Zircaloys' relatively high sensitivity to cold work enhanced irradiation growth and the associated deformation. Conversely, materials that exhibit a reduced sensitivity to cold work enhanced irradiation growth acceleration, for example the alloys of the present invention, will tend to exhibit a reduced likelihood of bowing or other deformation, thereby improving the tolerance of the components and reactors including such components.

In BWRs, the problem of channel bowing, and the associated increase in the likelihood of interference with the associated control blades results partly from differential irradiation growth in the channel. Accordingly, this problem can be addressed to some degree by controlling the material's crystallographic texture via β quenching and, in practice, by channel shuffling intended to provide more uniform radiation exposure and extend the working life of the channels and thereby avoid early and costly replacement. Those skilled in the art will appreciate that β quenching also tends to result in an undesirable increase in the creep rate of the quenched Zircaloy and should, therefore, be conducted in a manner that strikes a satisfactory balance between improving the crystallographic morphology and suppressing the creep rate. The problem of irradiation-induced channel bowing in BWRs has, therefore, been addressed to some extent through various alloy and treatment combinations, but there remains room for improved performance materials and processes. In particular, improved processes and materials that provide improved performance, reduced expense and/or increased tolerance of the reactor components in the hostile environment remain desirable.

The problem of bowing and interference between the control blade and the channel walls also results, in part, from a differential hydrogen content caused by differential localized "shadow" corrosion in the vicinity of dissimilar metal control blades. This mechanism has only been recently recognized as a significant contributor to the problem of channel bowing and accordingly no previously known solution exists to prevent the shadow bowing problem from occurring.

Proposals for addressing shadow corrosion have included the use of β-particle absorbing coatings on the control blade and low Mn content control blade materials, but these solutions appear to be based on a misunderstanding of the shadow corrosion mechanism.

Alloys according to example embodiments of the invention exhibit an improved combination of properties relative to Zircaloy-2 that include 1) reduced hydrogen pickup (on a percentage basis), 2) reduced or equivalent irradiation growth, 3) reduced sensitivity to cold work induced irradiation growth acceleration and/or 4) equivalent or increased creep resistance (reduced bulging). The cumulative effects of these various improvements provides reduced channel bowing (or bulging) under similar exposure conditions relative to the results obtained with conventional Zircaloy compositions.

Those skilled in the art will appreciate that the selection of these alloys is guided by the recognition that improving the contribution to the overall deformation of the fuel channel of one or more of the contributing conditions while generally maintaining or limiting the impact of the remaining contributory factors can reduce the likelihood that bowing will result in mechanical interference between the control blade(s) and the associated fuel channel(s). This reduced likelihood of bowing in the elongated structures formed from the inventive alloy provides an advantage over conventional Zr-alloy materials used as channels in BWRs.

Accordingly, reactor components, particularly elongated components, exposed to asymmetric strain inducing conditions, e.g., hydrogen pickup, and fabricated from an alloy corresponding to the example embodiments of the invention is expected to exhibit improvement in at least one factor selected from absorbing hydrogen (i.e., hydrogen pickup fraction, HPU), reduced irradiation growth, increased creep resistance and reduced sensitivity to cold work enhanced irradiation growth acceleration while the other factors remain essentially constant or exhibit a slight increase that does not overwhelm the reductions achieved in connection with other factors. Accordingly, it is expected that the overall impact of the operating environment on channel bowing will be reduced when channels fabricated from the inventive alloys are operated under neutron fluence gradients, subjected to differential corrosion, and thus differential hydrogen pickup and dilation, and when control blades fabricated from dissimilar materials are positioned in close proximity to a portion of the channel surface.

In more detail, the reduced irradiation growth may be related to reduced formation of <c>component dislocations than experienced in the conventional Zircaloys and the reduced hydrogen pickup is thought to be at least partially due to the reduced nickel levels that are specified. The reduced cold work sensitivity and possible increased creep resistance may be related to the dislocation structure as well. Exemplary embodiments of the invention include the use of square flow channels in an LWR fuel assembly in which nuclear fission control will be provided by altering the positioning of a dissimilar metal control blade between the channels, portions of the control blade coming into close proximity with two of the four sides of the channel.

The flow channel structures will be fabricated from a zirconium-based material consisting essentially of 0.6-1.2 wt % Nb; 0.2-0.4 wt % Fe; 0.5-1.2 wt % Sn; less than 120 ppm Si; less than 270 ppm C; 0.10-0.14 ppm O; less than 200 ppm Cr; less than 70 ppm Ni; with the balance being Zr and unavoidable impurities. These flow channel structures exhibit reduced hydrogen pickup, on a percentage basis, relative to conventional Zircaloy-2 channels and are expected to exhibit one or more additional improvements including, reduced irradiation growth, reduced irradiation growth sensitivity to cold work, and increased creep resistance. As a result, flow channels fabricated from the inventive alloys will exhibit reduced deformation and, consequently, a reduced likelihood of mechanical interference with the control blade even at relatively high fuel assembly exposures.

Preferred compositions for the alloy include 1) about 1% Sn; 0.2% Fe; 1% Nb with the balance being Zr and trace impurities; 2) 1% Sn; 0.35% Fe; 1% Nb with the balance being Zr and trace impurities; or 3) 1% Sn; 0.5% Fe; 1% Nb with the balance being Zr and trace impurities. Fabrication processes may include a late stage β quench to provide a channel structure exhibiting improved resistance to deformation.

Compared to the inventive alloy compositions, Zircaloy-2, currently the most commonly used material for fabricating flow channels in BWRs, exhibits neither the reduced growth characteristics nor the more uniform hydrogen pickup characteristics when subjected to shadow corrosion induced by close proximity of dissimilar, typically stainless steel, control blades. Further, Zircaloy-2 tends to exhibit a greater sensitivity to rapid irradiation growth when subjected to even small amounts of cold work that can be introduced during fabrication.

β quenched Zircaloy-2 flow channels with random texture will tend to exhibit reduced irradiation growth, but still lacks the more uniform hydrogen pickup characteristics when subjected to control blade shadow corrosion that is a feature of the inventive alloys. Compared to the inventive alloys, β quenched Zircaloy-2 also exhibits an increased creep rate that leads to increased channel bulging. Nb-containing Zr-based alloys have not been used in BWRs commercially as channels, even though they are known to have low irradiation growth properties. Likewise the E635 alloy has not been used commercially in BWRs though it has been used in Russian RBMK reactors.

It has been suggested that GE's Zr-1% Nb—Sn—Fe alloy (NSF) is unsuitable for use in a BWR due to its susceptibility to corrosion, requiring that its outer surface be clad with Zircaloy-2 to improve corrosion resistance for use in a LWR. Disclosure regarding various zirconium alloys may be found in Adamson's U.S. Pat. Nos. 5,361,282 and 5,805,656, the contents of which are incorporated herein by reference, in their entirety, to the extent not inconsistent with the present disclosure. Additional disclosure regarding various zirconium alloys may be found in Nikulina et al's U.S. Pat. No. 5,560,790, the contents of which is incorporated herein by reference, in its entirety, to the extent not inconsistent with the present disclosure. Such clad articles are more costly to produce and, because the recommended cladding is Zircaloy-2, would still suffer from the hydrogen dilation problem as a result of the Zircaloy-2's higher propensity for absorbing differential amounts of hydrogen when in close proximity to an inserted control blade of a dissimilar material. Data generated from samples revealed that alloys having 1.0 wt % Zr, 1.0% Nb-1.0Sn-0.2Fe (NSF2) have a lower hydrogen pickup on a percentage basis than either Zircaloy-2 or a Zr-0.6Nb-1.0Sn-0.2Fe-0.05Ni alloy (NSF2L). With respect to the NSF2L material, it is thought that the increased nickel content increased the hydrogen pickup relative to the basic NSF alloy, thus highlighting the advantages associated with fabricating BWR flow channels from a specific low—Ni Zr—Sn—Nb—Fe alloy.

Furthermore, the low nickel Zr—Nb alloys provide lower hydrogen pickup than Zircaloy-2 on a percentage basis, lower irradiation growth than alpha recrystallized Zircaloy-2, and significantly lower sensitivity to residual cold work acceleration effects, and possibly higher creep resistance. Addressing these issues with the alloy composition rather than various texture control approaches such as β quenching avoids the additional cost and control issues associated with the alternative fabrication quenching processes. The texture control provided by the quenching processes is also primarily intended to mitigate only one component of the various deformation processes to which the flow channels are subjected.

The limitations of the quenching processes notwithstanding, however, a β quenched NSF channel will typically have a more desirable combination of properties than a corresponding β quenched Zircaloy-2. Therefore, the present invention simultaneously addresses four separate factors that will tend to reduce channel bowing and, consequently, the likelihood of control blade interference simply by using an easily fabricated Zr-alloy material for fabricating the flow channels.

As will be appreciated, not all Zr—Nb—Sn—Fe alloys will exhibit the desired degree of reduction in hydrogen pickup percentage. Data generated from NSF2(Zr-1.0Nb-0.2Fe-1.0Sn-0.0Cr-0.0Ni) and NSF2L (Zr-0.6Nb-0.2Fe-1.0Sn-0.0Cr-0.05Ni) samples revealed that after four cycles of irradiation in a BWR, NSF2 samples averaged a 12% HPU, NSF2L samples averaged a 22% HPU and Zircaloy-2 samples averaged about 18%. Although there is a large difference in the Nb content among these samples, this comparison data supports the need for reducing even nominal amounts of Ni to maintain low hydrogen pickup. In comparison, Alloy E635, with an exemplary composition of $Zr_{0.974}Sn_{0.012}Nb_{0.01}Fe_{0.004}$, exhibits a hydrogen pickup percentage of greater than 25% under a variety of test water chemistry conditions as reported by A. Nikulina et al., ASTM STP 1295, p. 785, the contents of which is incorporated herein by reference, in its entirety, to the extent not inconsistent with the present disclosure.

A method for fabricating a fuel channel using an alloy according to an embodiment of the invention may include the steps of:
  obtaining an ingot with an initial diameter of an alloy composition in accord with the inventive compositions and of sufficient mass for forming the intended structure;
  bringing the ingot to a hot forging temperature $T_{HF}$;
  forging an initial slab from the heated ingot while maintaining the alloy at or near the hot working temperature with the thickness of the initial slab being between 30% and 10% of the initial diameter of the ingot;
  bringing the initial slab to a first hot rolling temperature $T_{HR1}$;
  hot rolling the initial slab to form an intermediate with the thickness of the intermediate slab being between 30% and 10% of the thickness of the initial slab;
  conditioning the intermediate slab to adjust the microstructure and/or reduce stress;
  bringing the intermediate slab to a second hot rolling temperature $T_{HR2}$;
  hot rolling the intermediate slab to form a strip preform with the thickness of the strip preform being between 95% and 50% of the thickness of the intermediate slab;
  conditioning the strip preform to adjust the microstructure and/or reduce stress;
  β-quenching the strip preform;
  holding the quenched strip preform at a conditioning temperature $T_c$ for a conditioning period;
  hot rolling the conditioned strip preform;
  annealing the rolled strip preform;
  cold rolling the annealed strip preform to achieve a thickness reduction of 15% to 50%;
  annealing the cold rolled strip preform in a non-oxidizing atmosphere;
  cold rolling the annealed cold rolled strip preform to a final thickness;
  cutting the strip preform to the final strip dimensions;
  conditioning the cut strip preform;
  adjusting the final thickness and polishing the surface to complete the strip.

A fuel channel or channel box can then be fabricated from a pair of the prepared strips with an example method according to the invention comprising:
  bending the strips into a pair of corresponding elongated open channels;
  welding the two open channels together along their longitudinal edges to form an open channel box;
  planishing the seams to flatten the welds;
  conducting a thermal stress relief anneal of the open channel box using an internal mandrel;
  cutting the annealed open channel box to length and machining and/or attaching other desired and necessary openings and/or structures;
  cleaning and treating the modified open channel box; and
  polishing the treated open channel box.

As will be appreciated by those skilled in the art, the process temperatures and times utilized during the course of fabricating the strip and the open channel box detailed above may vary somewhat depending on the desired final microstructure and configuration. Those skilled in the art will also appreciate that a number of researchers and patentees have disclosed the process parameters for a number of corresponding processes and that one or more of those processes could be adopted and/or modified to some degree to provide satisfactory fabrication performance.

EXAMPLE 1

Operating of a fuel channel (flow box) in the outer regions of a BWR core results in a gradient of accumulated fast fluence in opposite channel faces. This differential fast fluence accumulation, in turn, results in differential irradiation growth of the opposite channel faces that tends to deform, specifically to bow, the channel. If the bowing of the fuel channel becomes excessive, the control rod positioned between adjacent channels can become "pinched" or bound between the two channels to a degree sufficient to impair control rod motion. In extreme cases, this friction force can be sufficient to cause the control rod to become inoperable, i.e., to freeze, the control rod.

Because the control rod provided in conjunction with an array of fuel rods performs an important safety function, its ability to operate all control rods at all times through their full range of motion is an important safety and operational consideration. Considering an operating history of a conventional recrystallized Zircaloy-2 channel that results in sufficient fast fluence gradient-induced channel bow and channel-control blade friction to render the control blade inoperable, a Channel-Control Blade Interference Index value of 1.0 can be assigned for Zircaloy-2 as shown in FIG. 2 corresponding to the upper dashed line.

Figure 2:
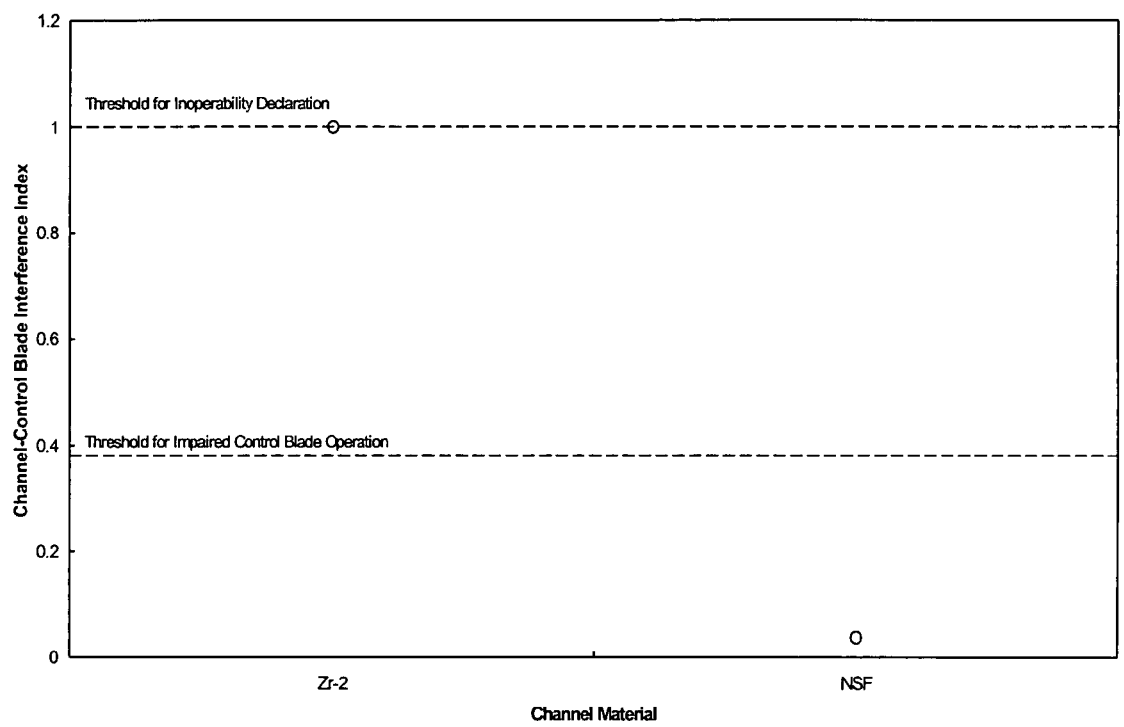
FIG. 2 provides a graphic representation of the data corresponding to Example 1 and reflects a performance comparison between recrystallized samples of Zircaloy-2 and the inventive alloy (NSF)

Also included in FIG. 2, as a dashed line, is the maximum tolerable level of channel-control blade interference that will enable the control blade to be used normally without any operational impact. Based on the measured irradiation growth characteristics of Zircaloy-2 and NSF, the Channel-Control Blade Interference Index value for NSF can be determined for the same operating history that resulted in an inoperable condition for the Zircaloy-2 channel. This result for NSF is also included in FIG. 2. It is observed from FIG. 2 that the performance improvement provided by NSF is substantial and is sufficient to reliably ensure acceptable results in commercial operating reactors.

EXAMPLE 2

Figure 3:
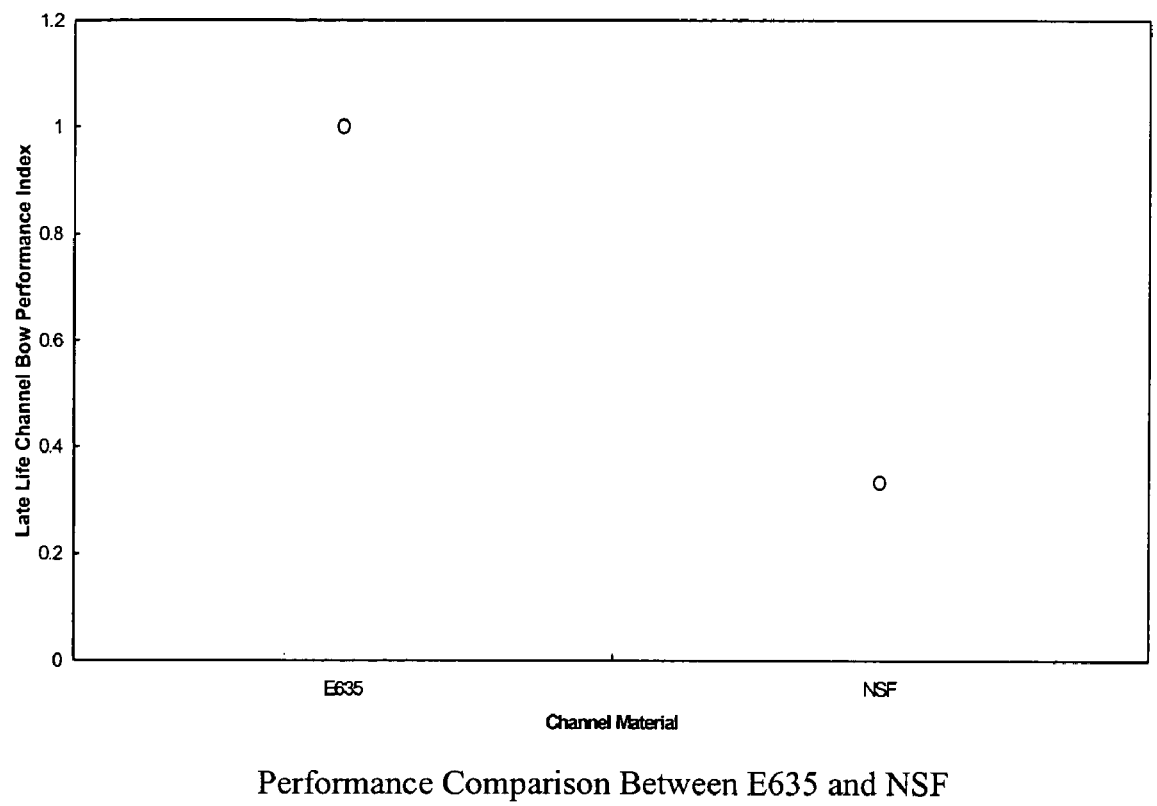
FIG. 3 provides a graphic representation of the data corresponding to Example 2 and reflects a performance comparison between an E635 alloy and the inventive alloy (NSF)

Alloy E635 is known within the nuclear industry as a low irradiation growth alloy, and therefore offers the performance advantages of a low growth alloy. However, the irradiation growth performance of NSF has been proven superior to alloy E635. Based on test reactor irradiations and corresponding irradiation growth measurements taken at multiple times during irradiation, the relative performance of NSF and E635 is known. Channel bow is determined by the rate of change of irradiation growth during the later periods of the operating lifetime of the channel. Comparing the measured rate of change of irradiation growth of alloy E635 and NSF over the same accumulated fast fluence interval that corresponds to the latter ~50% of the channel lifetime, the relative channel bow performance of NSF and E635 can be determined. FIG. 3 presents this performance comparison. In FIG. 3, a lower value of the performance index represents less channel bow and correspondingly improved performance. It is observed from FIG. 3 that NSF offers a significant improvement relative to the earlier known alloy E635.

EXAMPLE 3

Figure 4:
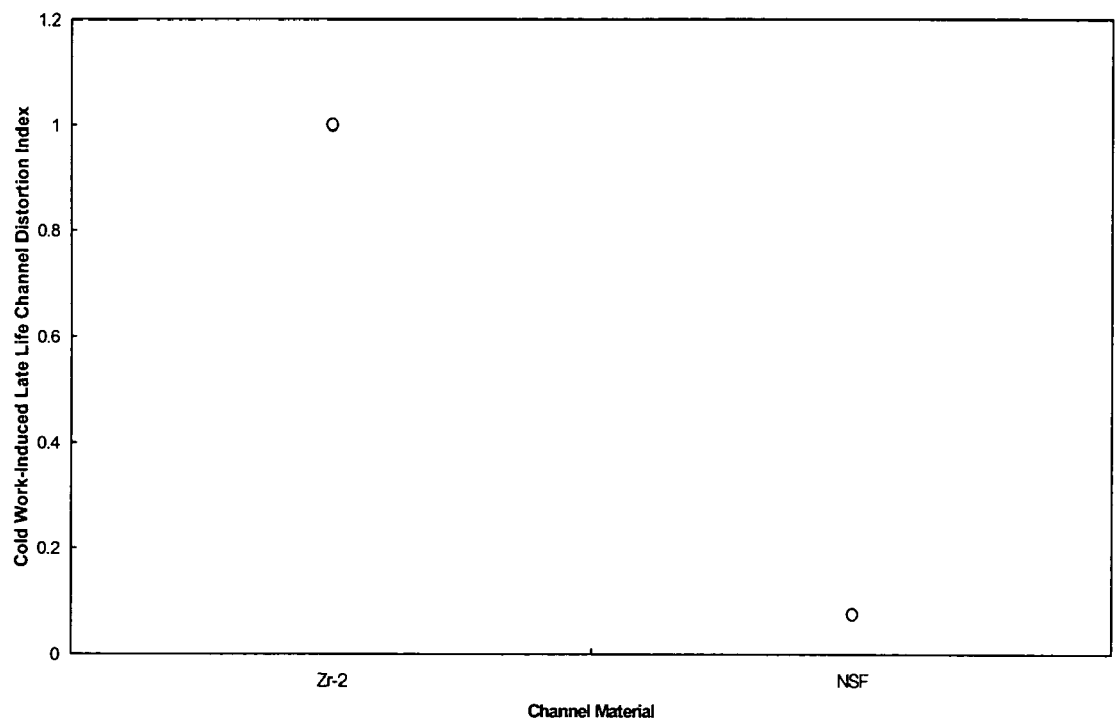
FIG. 4 provides a graphic representation of the data corresponding to Example 3 and reflects a comparison of the relative channel susceptibility to late life fabrication related cold work-induced channel distortion between samples of Zircaloy-2 and the inventive alloy (NSF).

Channel fabrication requires the application of processing steps that can induce cold work into the material. Historically, instances have occurred with Zircaloy-2 channels where an excessive amount of cold work resulted in irradiation growth induced dimensional instability of sufficient magnitude to result in significant channel bow and impaired control rod motion. Based on the measured irradiation growth characteristics of recrystallized Zircaloy-2 and NSF, an assessment similar to that presented in FIG. 3 can be performed. FIG. 4 presents the results of that assessment indicating the substantial inherent tolerance of the NSF material to the effects of cold work of the magnitude that has caused significant channel performance effects with recrystallized Zircaloy-2.

Although the invention has been described in connection with certain example embodiments, it will be evident to those of ordinary skill in the art that many alternatives, modifications, and variations may be made to the disclosed methods in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein illustrated, embodiments incorporating the claimed invention but more closely adapted for an intended use or performance requirements. Accordingly, it is intended that all such alternatives, modifications and variations that fall within the spirit of the invention are encompassed within the scope of the appended claims.

We claim:

1. A method for fabricating a reactor component from a zirconium alloy comprising:
   securing a sufficient quantity of a zirconium alloy including 0.6-1.2 wt % Nb; 0.2-0.5 wt % Fe; 0.5-1.2 wt % Sn; and no more than 70 ppm Ni; the balance of the zirconium alloy being Zr and impurities;
   forging a slab of the zirconium alloy;
   thermally conditioning the slab;
   forming the reactor component from the slab using a final cold work process; and
   completing the reactor component, without additional annealing of the slab subsequent to the final cold work process, to obtain a final reactor product having residual cold work stress.

2. The method for fabricating a zirconium alloy strip for use as reactor component from a zirconium alloy according to claim 1, comprising:
   obtaining an ingot having an alloy composition including 0.6-1.2 wt % Nb, 0.2-0.5 wt % Fe, 0.5-1.2 wt % Sn and no more than 70 ppm Ni, the balance of the zirconium alloy being Zr and impurities;
   the ingot having an initial diameter $D_i$ and a mass $M_i$ sufficient for forming the intended component;
   bringing the ingot to a hot working temperature $T_{HW}$;
   forging an initial slab from the heated ingot while maintaining the alloy at or near the hot working temperature with the thickness of the initial slab $D_s$ being between 30% and 10% of the initial diameter of the ingot; bringing the initial slab to a first hot rolling temperature $T_{HR1}$;
   hot rolling the initial slab to form an intermediate slab with the thickness of the intermediate slab $D_{int}$ being between 30% and 10% of the thickness of the initial slab;
   conditioning the intermediate slab at a first conditioning temperature $T_{c1}$, to adjust the microstructure and/or reduce stress;
   bringing the intermediate slab to a second hot rolling temperature $T_{HR2}$;
   hot rolling the intermediate slab to form a strip preform with the thickness of the strip preform $D_{sp}$ being between 95% and 50% of the thickness of the intermediate slab;
   conditioning the strip preform to adjust the microstructure and/or reduce stress;
   β-quenching the strip preform;
   holding the quenched strip preform at a conditioning temperature $T_c$ for a conditioning period; hot rolling the conditioned strip preform;
   annealing the rolled strip preform;
   cold rolling the annealed strip preform to achieve a thickness reduction of 15% to 50%;
   annealing the cold rolled strip preform in a non-oxidizing atmosphere;
   cold rolling the annealed cold rolled strip preform to a final thickness; and
   cutting the strip preform to the final strip dimensions.

3. The method for fabricating a reactor component from a zirconium alloy according to claim 1, wherein:
   the residual cold work stress is at least 2%.

4. The method for fabricating a reactor component from a zirconium alloy according to claim 3, wherein:
   the residual cold work stress does not exceed 10%.

5. The method for fabricating a reactor component from a zirconium alloy according to claim 1, wherein: the residual cold work stress is at least 10%.

6. The method for fabricating a reactor component from a zirconium alloy according to claim 1, wherein:
   the residual cold work stress is at least 25%.

* * * * *